(No Model.)
W. C. WELLS.
ROTARY MEASURE.
No. 437,065. Patented Sept. 23, 1890.
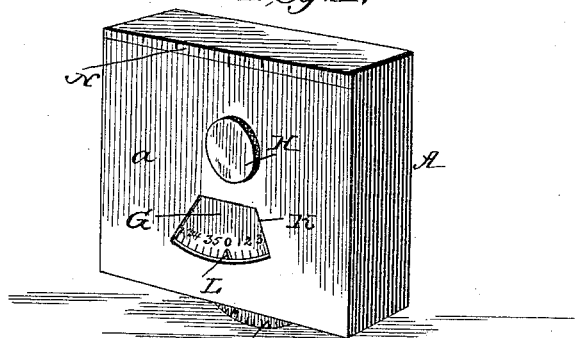
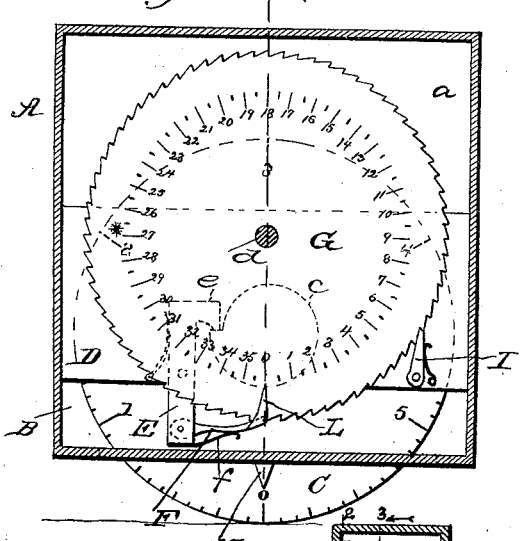
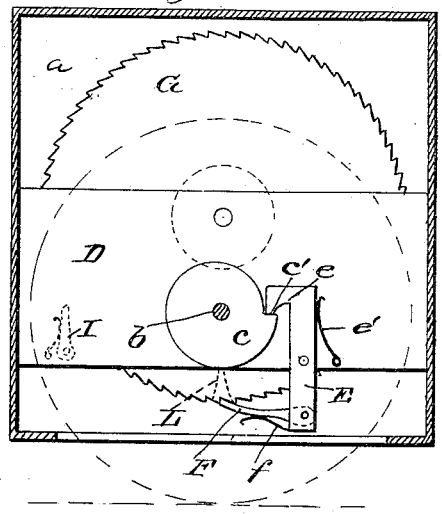
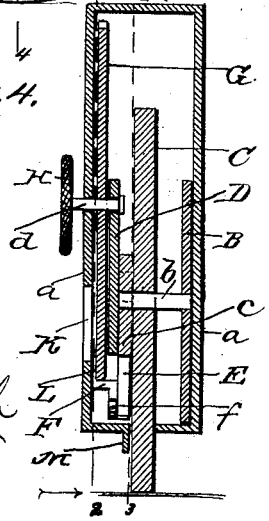
WITNESSES:
Fred G. Dieterich
Jos. A. Ryan
INVENTOR:
William C. Wells.
BY Munn & Co.
ATTORNEYS

UNITED STATES PATENT OFFICE.

WILLIAM C. WELLS, OF CHICAGO, ILLINOIS.

ROTARY MEASURE.

SPECIFICATION forming part of Letters Patent No. 437,065, dated September 23, 1890.

Application filed April 9, 1890. Serial No. 347,267. (No model.)

*To all whom it may concern:*

Be it known that I, WILLIAM C. WELLS, of Chicago, in the county of Cook and State of Illinois, have invented a new and useful Improvement in Rotary Measures, of which the following is a specification.

My invention relates to an improved rotary measure in which the distance traversed by the rotating wheel is registered when the distance traversed is greater than the circumference of the rotating measure.

The object of my invention is to produce a measure of the character described which is adapted for measuring straight, curved, or compound lines and distances of all descriptions, such as the inside measures of boxes, rooms, &c.

A further object of my invention is to provide a rotary measure which will be simple in construction and accurate in its operations.

With these objects in view my invention consists of a casing having vertical sides, a graduated wheel journaled in said casing and operating an indicator-disk by means of a cam, disk, lever, and pawl; and my invention consists, further, in certain details of construction and combination of parts, such as shown in the accompanying drawings, and more fully hereinafter described.

In the accompanying drawings, Figure 1 is a perspective view of my improved rotary measure ready for use. Fig. 2 is a side elevation of the same, the front side of the casing being removed to show a portion of the operating mechanism. Fig. 3 is a view similar to Fig. 2, but having the rear side of the casing removed. Fig. 4 is a transverse vertical section of the device, and Fig. 5 shows the manner of using the same.

In the embodiment of my invention I employ a casing A, having the vertical sides $a$, said casing being preferably formed in the shape of a right parallelopiped, as shown. The casing may be of any suitable material, and may be formed in a single piece or in a number of parts, and it is preferred that it be closed at the top.

A plate B is secured within the casing near its rear side in any suitable manner, and connected with said plate is the arbor or journal $b$, upon which is mounted the revolving wheel measuring-disk C, extending down through the open or slotted bottom of the casing, the circumference of said disk being divided into inches and fractions thereof, the inches being indicated by numerals, as shown, and the fractions by lines. The casing may be of any size, and likewise the measuring-wheel, according to the character of the work for which it is intended to be used.

Integral with or rigidly connected to the measuring-wheel C is the cam-shaped disk $c$, having the shoulder $c'$, the purpose of which will appear farther on.

A second plate D is secured within the casing near its front side, and to the inner side of said plate is pivoted the vibrating lever E, said lever having an extension or head $e$, formed integral with its upper end, and to its lower end is pivoted the pawl F, said pawl being held in operative position by means of a spring $f$, attached to the lever E and bearing upon the lower side of said pawl. The lever E is held in position and assisted in its operations by means of the spring $e'$, attached to the plate D and bearing upon said lever, as shown.

The indicator-disk G is journaled on the outer side of the plate D upon the arbor or journal $d$, said arbor extending through the front side of the casing, and upon its outer end is secured the thumb-wheel or disk H. The disk G is provided with a ratchet-periphery, the teeth of said ratchet being adapted to be engaged by the pawl F, and the lever E is so arranged that its head or extension $e$ will be engaged by the cam-shaped disk $c$ at each revolution of the measuring-wheel C and throw the lever back, thus operating the pawl to move the indicator and recorder disk one tooth forward. The moment the shoulder $c'$ has passed the head $e$ of the lever the spring $e'$ throws the said head down upon said shoulder, as shown in Fig. 3, and the pawl F is brought back to the next tooth ready to move the indicator-disk forward the distance of one tooth as soon as another revolution has been completed.

A pawl I is secured to the plate D and engages the ratchet indicator-disk to hold the same in place and prevent any backward movement.

The indicator-disk has its circumference divided into feet and fractions thereof, as desired. In the accompanying drawings the measuring-wheel is six inches in circumference, and the number of feet traversed are indicated by the numerals upon the indicator-disk and the fractions thereof by short lines.

The front side of the casing is cut away, as shown at K, to expose a portion of the graduated face of the disk G.

In order to provide an indicator or pointer that shall always indicate the proper distance traversed by the measuring-wheel, I employ an indicator or pointer L, which is integral with or rigidly attached to the engaging end of the pawl, said indicator extending upward, as shown, and pointing directly to the foot or fraction thereof which was last registered.

An indicator M is secured also to the lower side of the front face of the casing to indicate the number of inches or fractions thereof traversed by the measuring-wheel above that registered.

Upon the front face of the casing, preferably near the upper edge, is placed a scale or measure N, as shown, the purpose of which is to measure distances less than the length of the casing.

In order that the casing can be placed flush against one of the vertical boundaries of a surface or line to be measured—say the side of a box—it is necessary in order to obtain a correct measurement of the distance to take into account the length of the casing of device. This is always done in constructing any device, and the length of the casing always indicated upon the measuring-wheel by some suitable symbol. In this case I have shown a star. When using my improved measure with the side of the casing flush with a vertical surface as the starting-point, the measuring-wheel is revolved until the star or other symbol is brought into alignment with the pointer M, and in measuring the case is moved forward until the opposite side of the casing comes in contact with the other vertical bounding surface. The sum of the distances indicated upon the measuring-wheel C and indicator-disk G will be the true distance traversed by the device.

By means of the thumb-wheel or disk H the indicator-disk can be set back to zero whenever desired.

The operation of my device being clear to every one needs no further description here.

The advantages of my improved rotary measure are that by means of the casing constructed and compensated for, as described, the precise measurement can be obtained, and by means of the indicator being rigid with the operating-pawl it will always point to the proper distance and there will be no stopping of the device with the pointer between two lines, as is the case with other devices of this character.

The employment of levers and ratchets is also a great advantage over cogs and the like constructions.

Having thus described my invention, what I claim is—

1. In a rotary measure, the combination, with a measuring-wheel, of a casing having vertical sides inclosing said wheel, a cam-shaped disk adapted to move in unison with the measuring-wheel, a ratchet-faced disk journaled within the casing, a vibrating lever secured within the casing and adapted to be operated by the cam-shaped disk, a pawl carried at the lower end of said lever adapted to engage the ratchet-faced indicator-disk, and the pointer rigidly connected with the engaging end of the said pawl to indicate the distance traversed by the measuring-wheel, substantially as shown and described.

2. In a rotary measure, the combination, with a casing having vertical sides, of a measuring-wheel journaled within said casing graduated as described, and having the length of the casing designated upon the circumference of the measuring-wheel, substantially as and for the purpose described.

3. In a rotary measure, the combination, with a casing having vertical sides and an apertured face, of a measuring-wheel journaled within the casing and having the length of the casing marked upon the circumference of the said wheel, the indicator-disk, cam-shaped disk, vibrating lever, and pawl for operating said indicator-disk, substantially as shown and described.

WILLIAM C. WELLS.

Witnesses:
M. SCHLESINGER,
J. C. MCLACHLAN.